(12) United States Patent
Mueller et al.

(10) Patent No.: US 7,600,617 B1
(45) Date of Patent: Oct. 13, 2009

(54) INDUSTRIAL SHOCK ABSORBER FOR USE IN A CONVEYOR SYSTEM

(75) Inventors: Gerald E. Mueller, Frankenmuth, MI (US); Gene B Slachta, St. Charles, MI (US); Douglas W. King, Hemlock, MI (US)

(73) Assignee: General Manufacturing Systems, Inc., Saginaw, MI (US)

( * ) Notice: Subject to any disclaimer, the term of this patent is extended or adjusted under 35 U.S.C. 154(b) by 239 days.

(21) Appl. No.: 11/390,548

(22) Filed: Mar. 28, 2006

Related U.S. Application Data

(60) Provisional application No. 60/665,669, filed on Mar. 28, 2005.

(51) Int. Cl.
 *F16F 13/00* (2006.01)
(52) U.S. Cl. .................. 188/282.6; 188/312; 188/316; 267/196; 267/203
(58) Field of Classification Search ............. 188/282.6, 188/381; 92/178; 267/196, 201; 104/172.3, 104/172.4; 213/1 R, 7, 62 R
See application file for complete search history.

(56) References Cited

U.S. PATENT DOCUMENTS

| | | | | |
|---|---|---|---|---|
| 2,444,305 A | * | 6/1948 | Milhizer | 267/115 |
| 3,720,172 A | * | 3/1973 | Dehne | 104/172.4 |
| 3,919,509 A | * | 11/1975 | Schnitzius | 200/61.62 |
| 4,048,905 A | * | 9/1977 | Souslin | 91/405 |
| 4,328,960 A | * | 5/1982 | Handke et al. | 267/226 |
| 4,442,759 A | * | 4/1984 | Elser | 92/165 PR |
| 4,815,574 A | * | 3/1989 | Taylor et al. | 188/280 |
| 5,244,284 A | * | 9/1993 | Larson et al. | 384/58 |
| 5,407,052 A | * | 4/1995 | Heideman et al. | 198/343.2 |
| 5,511,486 A | | 4/1996 | Pollard et al. | |
| 6,244,451 B1 | * | 6/2001 | Summa et al. | 213/62 R |
| 6,845,720 B2 | * | 1/2005 | Summa | 104/172.3 |
| 7,350,774 B2 | * | 4/2008 | Chun et al. | 267/75 |

* cited by examiner

*Primary Examiner*—Robert A Siconolfi
*Assistant Examiner*—Mariano Sy
(74) *Attorney, Agent, or Firm*—Reising Ethington P.C.

(57) ABSTRACT

An apparatus for controlling relative movement between two interconnected bodies includes a first end cap, a second end cap having an opening, a sleeve interconnecting the end caps to define a chamber between the sleeve and the end caps, a piston assembly including a piston rod extending through the opening of the second end cap, a piston connected to the piston rod, received in the chamber to define at least two fluid chambers on opposed sides of the piston, and a plurality of rollers carried by the piston for rolling engagement with the sleeve. A fluid flow path provides communication between the fluid chambers and provides a restricted fluid flow rate therethrough to control the rate of fluid transfer between the fluid chambers and permit fluid pressure to increase in a chamber into which the piston is being moved to provide a force on the piston opposing its movement.

11 Claims, 9 Drawing Sheets

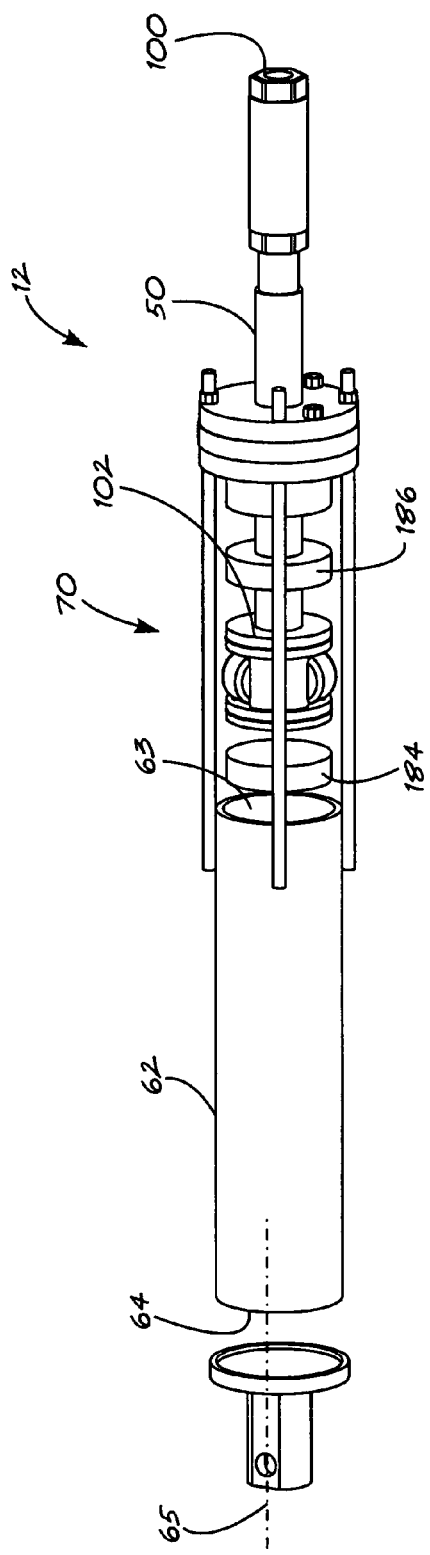
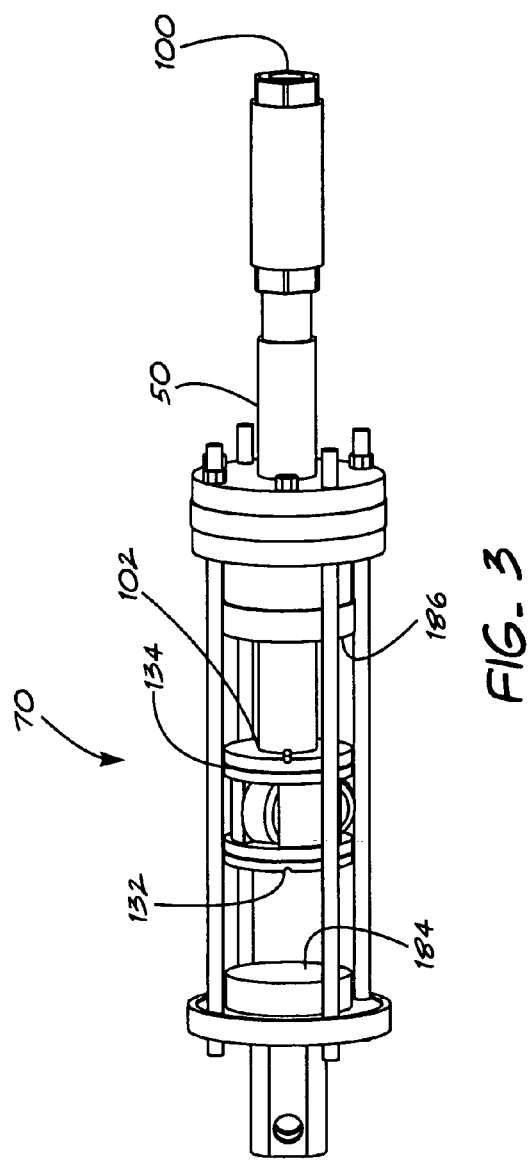

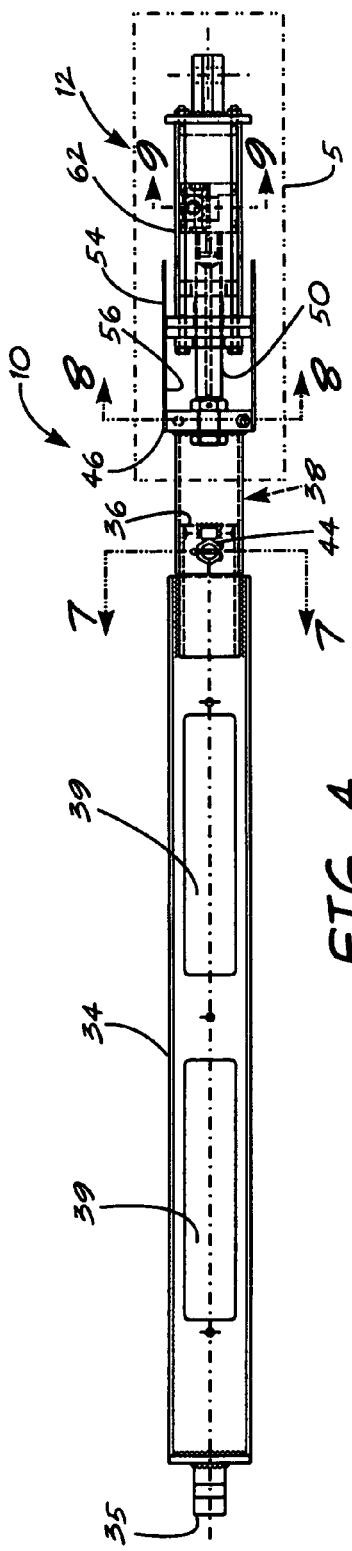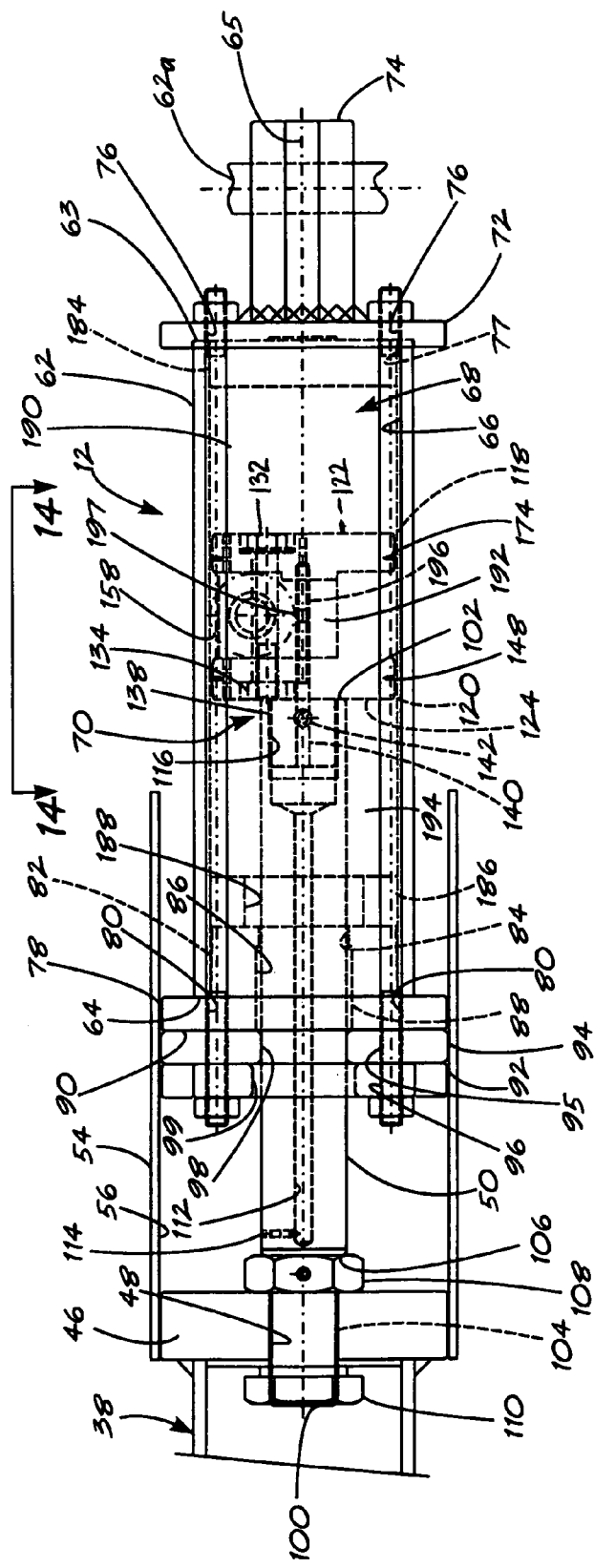

INDUSTRIAL SHOCK ABSORBER FOR USE IN A CONVEYOR SYSTEM

REFERENCE TO RELATED APPLICATION

This application claims the benefit of U.S. Provisional Patent Application Ser. No. 60/665,669, filed on Mar. 28, 2005 and hereby incorporates the provisional application in its entirety.

FIELD OF THE INVENTION

This invention relates generally to a shock absorber and more particularly to a shock absorber that may be used in a conveyor system.

BACKGROUND OF THE INVENTION

Vehicles in a state of construction are typically transported via a conveyor system through an assembly plant from one workstation to another to facilitate the efficient manufacture and assembly of the vehicles. The vehicles are typically connected to one another via a tow bar and are commonly temporarily detached from a drive mechanism incorporated within the conveyor system to allow operations to be performed on the vehicles as they remain stationary in a pause mode, and, then, are recoupled to the drive mechanism so they can be transported to the next operation. While being detached and recoupled to the conveyor system, the vehicles and conveyor system typically encounter shock loads. The shock loads, unless properly absorbed, can result in damage to the vehicles and/or the conveyor system and can also produce excessive fatigue and wear to components of the conveyor system.

In an attempt to reduce the shock loads resulting from starting and stopping the relatively heavy vehicles from the conveyor system, it is known to incorporate industrial shock absorbers between a tow bar drawn platform carrying the vehicle and the conveyor system. The shock absorbers are typically one of three types, pneumatic, hydraulic, or mechanical. Regardless of the type, generally the shock absorbers are initially effective in reducing shock forces between the platform and the conveyor system, however, typically the shock absorbers become fatigued or damaged in use. Fatigue to the shock absorbers commonly results in the form of warn seals, friction plates, or other internal components, which can be exacerbated by the harsh environmental conditions at certain work stations within the plant, such as excessive heat, dust and airborne paint droplets, for example. Damage to the shock absorbers commonly results from the high loads encountered in side loading or bending type situations as the carrier platform navigates tight corners along the conveyor system. As such, the shock absorbers typically require more than routine maintenance, excessive repair, and frequent replacement. This adds costs to the vehicle manufacturing process.

SUMMARY OF THE INVENTION

An apparatus for controlling relative movement between two interconnected bodies includes a housing including a first end cap, a second end cap having an opening therethrough, a sleeve extending between and interconnecting the end caps to define a chamber between the sleeve and the end caps, a piston assembly including a piston rod extending through the opening of the second end cap, a piston connected to the piston rod, received in the chamber to divide the chamber into at least two fluid chambers on opposed sides of the piston, and a plurality of rollers carried by the piston for rolling engagement with the sleeve. The piston is moveable within the chamber to thereby decrease the volume of one of the fluid chambers while increasing the size of the other fluid chamber. A fluid flow path provides communication between the fluid chambers and provides a restricted fluid flow rate therethrough to control the rate of fluid transfer between the fluid chambers and permit fluid pressure to increase in a chamber into which the piston is being moved to provide a force on the piston opposing its movement.

In one implementation, the apparatus is used as a shock absorber for a telescopic tow bar assembly and is located adjacent to conveyor platforms to dampen the accelerations experienced at the platforms. In one form, the shock absorber includes at least one spring that yieldably biases the shock absorber to a first position to provide a reliable and consistent reference position for the shock absorber to facilitate docking conveyor platforms. The spring or springs may also dampen the accelerations in the system in combination with the piston assembly.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 2 is a partially exploded perspective view of the shock absorber of FIG. 1;

FIG. 3 is a partially assembled perspective view of the shock absorber of FIG. 1 with a sleeve of the shock absorber removed therefrom;

FIG. 4 is a partially cutaway schematic side view of the shock absorber carrying tow bar assembly of FIG. 1;

FIG. 5 is a schematic enlarged view of the chain line enclosed area 5 of FIG. 4;

DETAILED DESCRIPTION OF THE PREFERRED EMBODIMENTS

Figure 1:
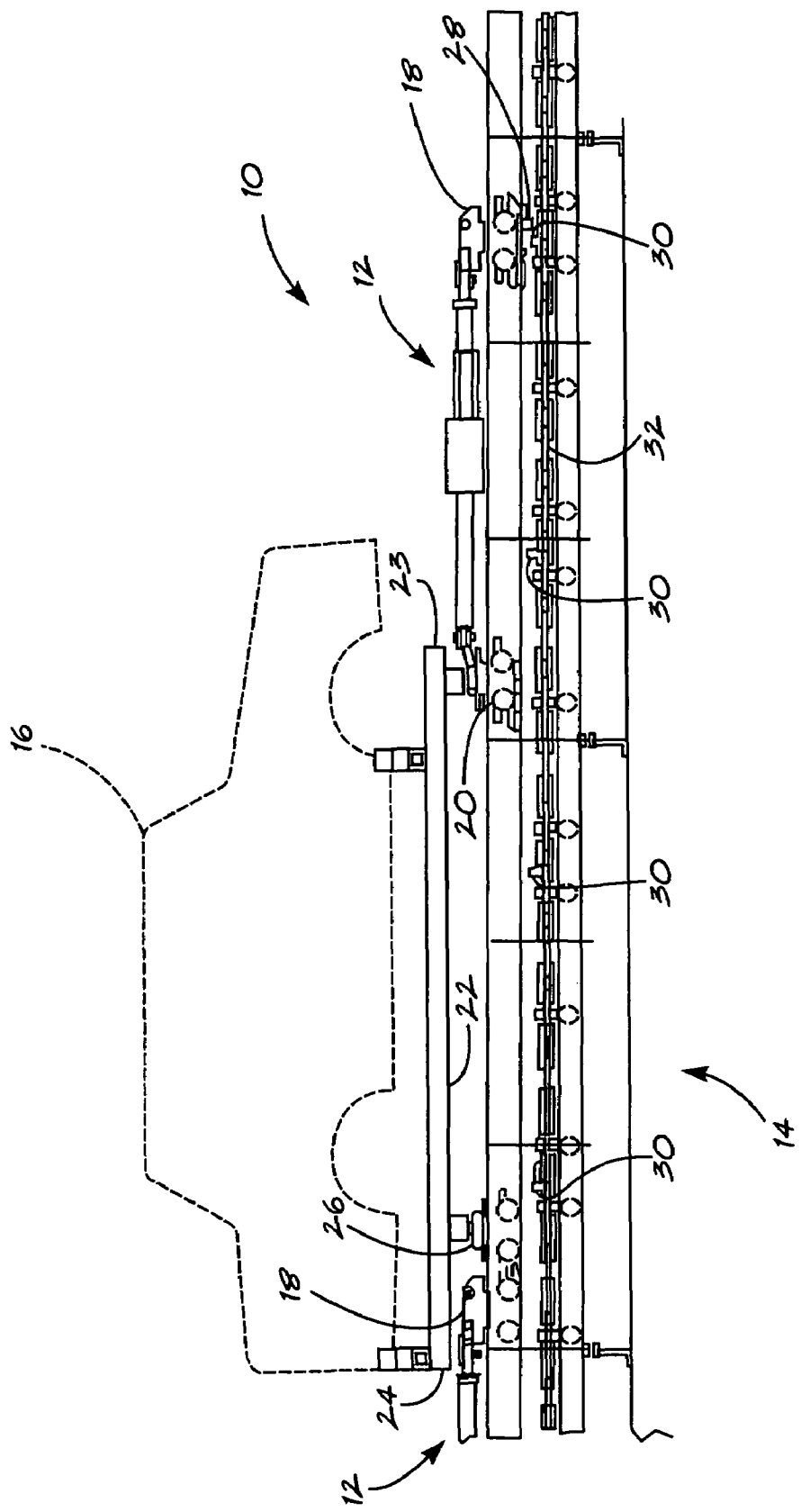
FIG. 1 is a partial schematic side view of a conveyor system showing a platform operably coupled to a pusher dog on the conveyor system via a tow bar assembly which incorporates a telescopic shock absorber constructed according to one presently preferred embodiment of the invention.

Referring in more detail to the drawings, FIG. 1 illustrates a telescoping tow bar assembly 10 having a multi-chamber industrial shock absorber 12 constructed according to one embodiment of the invention for use as part of a conveyor system 14 for a production line for assembling and manufacturing various heavy products, such as automotive vehicles 16, for example. The tow bar assembly 10 interconnects a leading tow bar trolley 18 to an intermediate tow bar trolley 20. The intermediate trolley 20 is operably connected to a rigidly carried platform 22 preferably at one of the ends 23 of the platform 22, and the other end of the platform 22 is operably supported for intermittent movement with the conveyor system 14 by a trailing trolley 26. The leading trolley 18 of each tow bar has a depending driving dog 28 arranged for releasable engagement with one of a plurality of pusher dogs 30 extending upwardly from a conveyor chain 32. When starting and stopping the platforms 22, the platforms and vehicles need to be protected from impositions of considerable shock forces. As one of the pusher dogs 30 initially engages one of the driving dogs 28, rapid acceleration of the leading trolley 18 results, wherein the acceleration shock load otherwise transferred through the tow bar assembly 10 to the platform 22 and vehicle 16 is mitigated. Also, when one of the leading trolleys 18 engages an adjacent trailing trolley 26 on the tow bar assembly ahead, the leading trolley 18 suddenly decelerates, whereupon the deceleration must be prevented from being suddenly transferred through the tow bar assembly 10 to the platform 22 and vehicle 16. As such, the shock absorbers 12 of the tow bar assemblies 10 are responsive to severely reduce the impact loads that result from these sudden accelerations and decelerations, thereby reducing the wear and/or damage to the components of the conveyor system 14, and also possibly to the vehicles 16.

Figure 6:
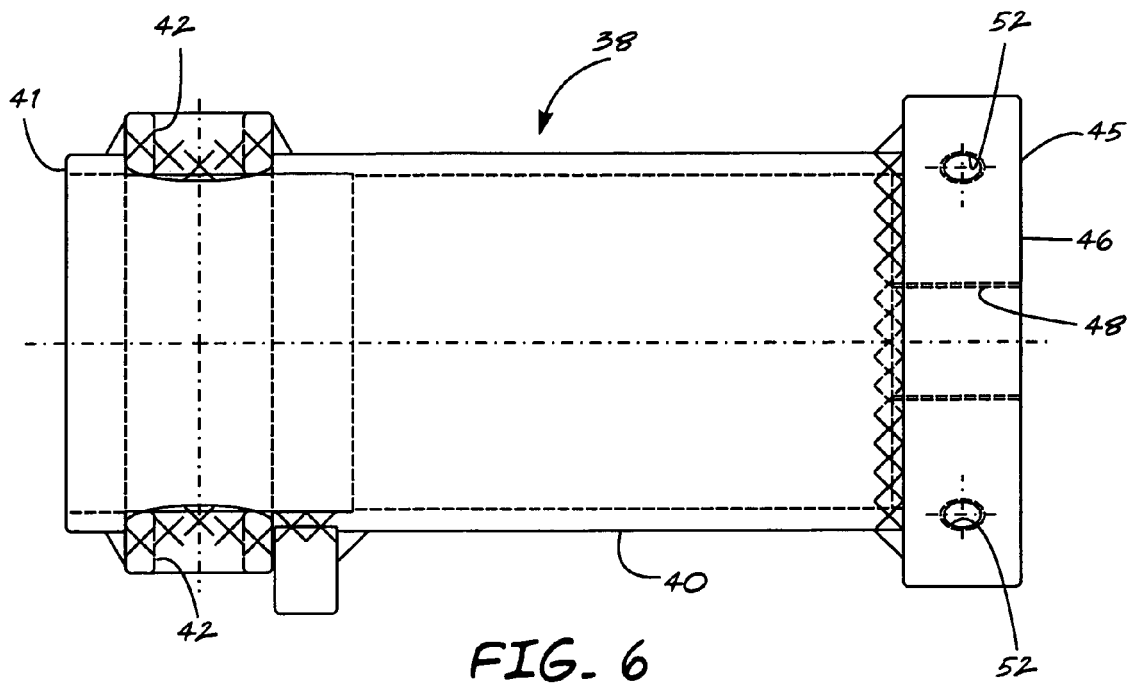
FIG. 6 is a side view of an intermediate adapter for connecting the shock absorber with the remainder of the tow bar assembly.
Figure 7:
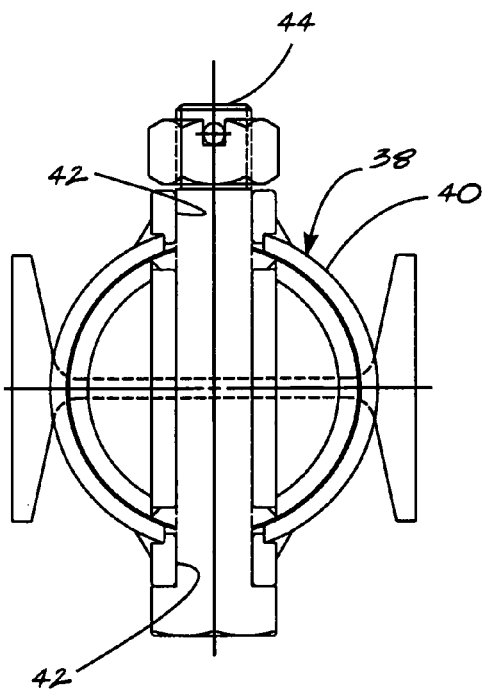
FIG. 7 is a cross sectional view taken generally along line 7-7 of FIG. 4.

As shown in FIG. 4, each tow bar assembly 10 has an elongate member or bar 34, with one end 35 operably attached to an intermediate trolley 20 and another end 36 operably attached to a connecting intermediate adaptor 38 (FIG. 6). The bar 34 is preferably arranged for receipt of at least one reader card 39 along a portion of its length, wherein each reader card identifies the work to be performed on the vehicle being constructed, as is known.

The intermediate adaptor 38 has a generally cylindrical outer wall 40 with one end 41 having a pair of laterally opposite through openings 42 sized for receipt of a pin or bolt 44 (FIG. 4) to facilitate quick, releasable attachment of the adaptor 38 to one of the ends 36 of the tow bar 34. Another end 45 of the adaptor 38 has an end wall 46 fixed thereto with a generally coaxial opening 48 extending therethrough. The opening 48 is sized for receipt of a piston shaft or rod 50 closely therein to facilitate attachment of the adaptor 38 to the shock absorber 12. Preferably, the end wall 46 has circumferentially spaced threaded openings 52 extending radially inwardly therein to facilitate attachment of a shock absorber piston rod cover 54 (FIG. 4) to the adaptor 38.

Figure 8:
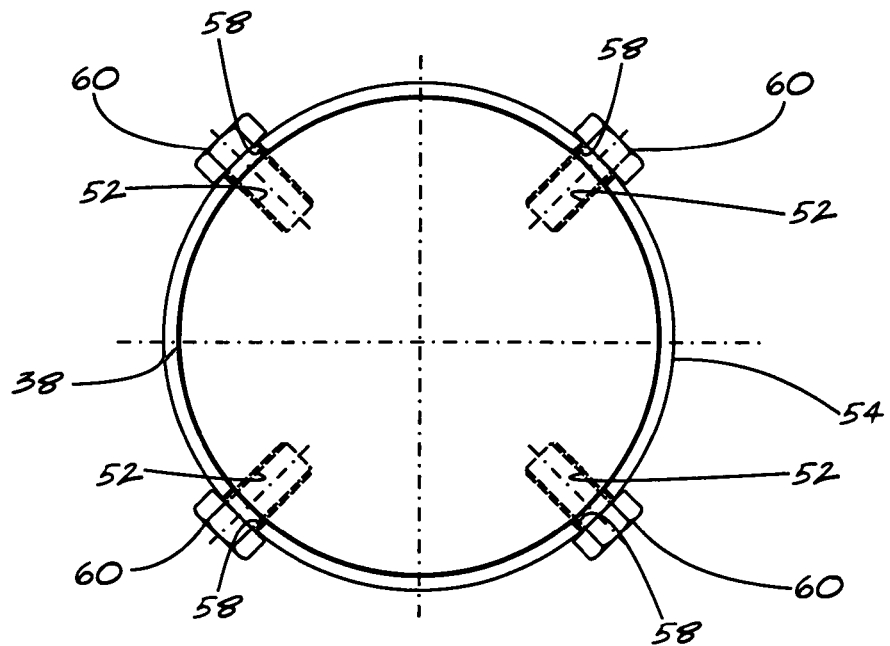
FIG. 8 is a cross sectional view taken generally along line 8-8 of FIG. 4.

As shown in FIGS. 4 and 5, the cover 54 is preferably constructed from cylindrical tubing with an inner surface 56 preferably being sized for a close fit over the end wall 46 of the intermediate adaptor 38. Through openings 58 (FIG. 8) are preferably arranged adjacent one end of the cover 54 for alignment with the threaded openings 52 in the adaptor end wall 46. As such, fasteners, such as threaded bolts 60, for example, can preferably be used to attach the cover 54 to the end wall 46 of the adaptor 38 with the cover 54 extending away from the tow bar 34. The cover 54 extends axially from the end wall 46 a sufficient distance to shield the piston shaft 50 from direct exposure to the ambient conditions when the shock absorber 12 is in a fully extended position due to an acceleration force.

As best shown in FIGS. 2, and 5, the shock absorber 12 has an elongate cylindrical, tubular sleeve or housing 62, extending between opposite ends 63, 64 defining a cylinder which has a longitudinal axis 65. The housing 62 has an interior wall with an inner surface 66 defining at least in part at least one chamber 68 sized for receipt of a piston head or head assembly 70. When the tow bar assembly 10 is abruptly halted, the piston head 70 moves forwardly along the axis 65 from a first extended position to a second retracted position. When the conveyor chain 32 is accelerated, the cylinder moves forward along the axis 65 relative to the piston head 70. The inner surface 66 is preferably honed to provide a smooth sliding and rolling surface for the piston head assembly 70.

The housing 62 is substantially closed off at one end 63 by a first end wall or cap 72. The first end cap 72 preferably has a clevis or arm 74 extending axially outwardly therefrom to facilitate attachment of the shock absorber 12 to the leading trolley 18, such as through the use of a pin 62a, for example. The first end cap 72 has an outer diameter preferably greater than the outer diameter of the housing 62 and preferably has a plurality of circumferentially spaced openings 76, represented here as four, spaced radially outwardly from the housing 62 to facilitate attachment of the first end cap 72 to the housing 62. Additionally, the first end cap 72 preferably has a counter bore 77 to facilitate piloting the housing 62 relative to the first end cap 72.

As shown in FIG. 5, the housing 62 is abutted at another end by a second end wall or cap 78 opposite the first end cap 72. The second end cap 78 has an outer diameter substantially the same size as the first end cap 72 with a plurality of openings 80 arranged for axial alignment with the openings 76 in the first end cap 72. The second end cap 78 preferably has a generally coaxial reduced diameter nose 82 sized for a loose fit within the housing 62 to facilitate piloting the housing 62 relative to the second end cap 78. An opening 84 sized to receive, preferably in a loose fit, the piston shaft 50, extends coaxially through the nose 82 of the second end cap 78. The opening 84 preferably has an enlarged diameter portion 86 sized for receipt of a journal or sleeve bearing 88 to facilitate creating a sliding seal between the opening 84 and the piston shaft 50.

In addition to the second end cap 78, an end cover 92 is preferably provided with an expansion washer 94 which is received between the end cap 78 and the end cover 92 on rod 50. The expansion washer 94 and end cover 92 each have a plurality of openings 95, 96, respectively, arranged for axial alignment with the respective openings 76, 80 in the first and second end caps 72, 78, and central openings 98, 99, respectively, sized for receipt of the piston shaft 50. The central opening 98 in the expansion washer 94 is preferably sized for a close fit with the piston shaft 50 and is preferably formed from a polymeric material, such as glass filled Teflon®, for example, thereby providing the shock absorber 12 with the ability to expand and contract axially when operating over a range of ambient temperatures.

As shown in FIG. 5, the piston rod 50 has a first end 100 arranged for operable communication with the tow bar 34, and shown here as being secured to the end wall 46 of the intermediate adaptor 38, and a second end 102 arranged for attachment to the piston head assembly 70. The first end 100 is represented here, by way of example and without limitations, as having a reduced diameter threaded portion 104 sized for receipt in the opening 48 in the intermediate adaptor end wall 46. The reduced diameter portion 104 extends along a predetermined length of the piston rod 50 and terminates at an outwardly extending shoulder 106. To provide an increased shoulder abutment, prior to attaching the piston rod 50 to the end wall 46, a nut 108 can be threaded onto the threaded portion 104 so that is preferably in contact with the shoulder 106 upon assembly. Thereafter, the remaining exposed threaded portion 104 is inserted through the opening 48 in the end wall 46 so that another nut 110 can be threaded thereon to capture the end wall 46 between the nut 110 and the shoulder 106.

The piston rod 50 preferably has an internal air communication passage 112 extending coaxially from the second end 102 toward the first end 100, which preferably terminates just short of the reduced diameter portion 104. An opening 114 extends radially into the piston rod 50 to intersect the passage 112 adjacent the reduced diameter portion 104. The second inner end 102 of piston rod 50 preferably has a female threaded bore 116 extending therein to facilitate attachment of the piston rod 50 to the piston head assembly 70. The piston shaft 50 may be constructed from a corrosion resistant, high strength material, such as a chromed steel having a core with a hardness of about 20-28 Rockwell C, for example. Such properties may be desirable in applications where the apparatus is subjected to high temperatures or condensation, such as may be encountered in a paint curing station.

Figures 10, 11:
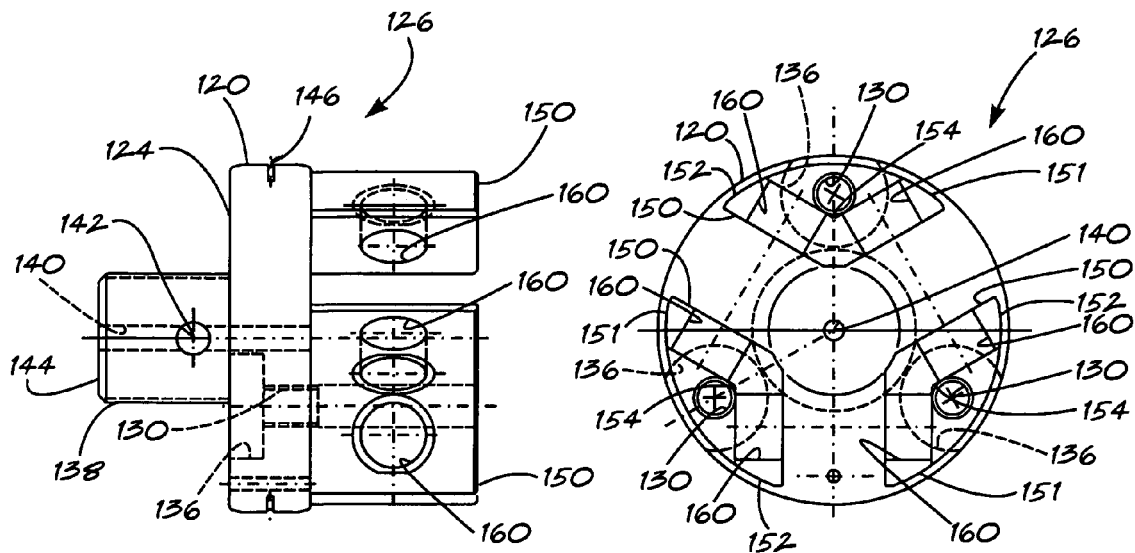
FIG. 10 is a side view of a portion of the piston head of the shock absorber.
FIG. 11 is a front view of the piston head of FIG. 10.

As shown in FIG. 5, the piston head or head assembly 70 has front and rear interfitting head portions, referred to hereafter as guide carrier or carrier 126 (FIGS. 10 and 11) and cap 128 (FIGS. 12 and 13), respectively, preferably partly spaced axially from one another to define mid head chamber 192. The carrier 126 and cap 128 have front and rear heads 118, 120 with front and rear head surfaces 122, 124, respectively. The front head surface of the cap 128 preferably closes the chamber 192 of the piston head assembly 70. The carrier 126 has a plurality of openings 130, represented here as three, spaced circumferentially equidistant from one another, adjacent the outer periphery. The carrier 126 is attached to the cap 128 preferably through the use of bolts 132 having enlarged heads and threaded shanks for threaded engagement with nuts 134. As shown in FIGS. 10 and 11, to accommodate the nuts 134, the openings 130 preferably have counterbores 136 extending axially into the rear head surface 124 so the nuts 134 are generally flush or recessed relative to the rear head surface 124 upon fastening the head carrier 126 to the head cap 128.

As shown in FIG. 10, the carrier 126 preferably has an externally threaded post 138 extending outwardly from the rear head surface 124 which is sized for mating threaded engagement with the bore 116 in the piston shaft 50. A through passage 140 preferably extends coaxially through the post 138 and the rear head 120. Preferably, an opening 142 extends radially into the post 138 for communication with the through passage 140 between an end 144 of the post 138 and the rear head surface 124. The rear head 120 preferably has an annular groove 146 extending about its outer periphery for receipt of a replaceable piston ring 148 (FIG. 5).

Figure 9:
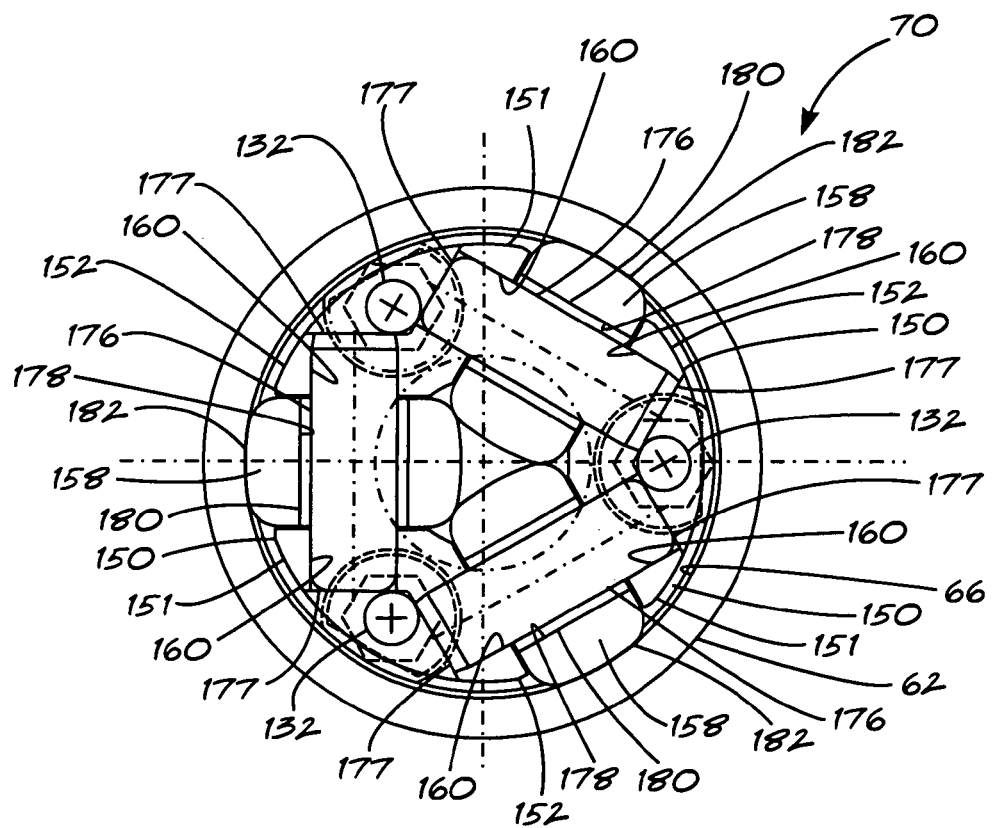
FIG. 9 is a cross sectional view taken generally along line 9-9 of FIG. 4.

The carrier 126, shown here, by way of example and without limitations, has three generally v-shaped extension fingers or bridge devises 150 extending axially from the rear head 120, with the devises 150 preferably being spaced circumferentially equidistant from one another. Each bridge clevis 150 has a pair of diverging walls 151, 152 that extend radially outwardly no further than the outer perimeter of the rear head 120. The walls 151, 152 preferably diverge radially inwardly of and about the openings 130 in the rear head 120 so the openings 130 lie unobstructed in pockets or confluences 154 defined by the diverging walls 151, 152. The adjacent walls 151, 152 of the adjacent bridge devises 150 extend generally parallel to one another and are spaced a predetermined circumferential distance to define spaces 156 sized to receive pin supported rollers 158 (FIG. 9). Each of the walls 151, 152 has an opening 160 to receive roller pins 176 which bridge the adjacent openings 160 of adjacent bridge devises 150 and are arranged in axial alignment with one another.

Figures 12, 13:
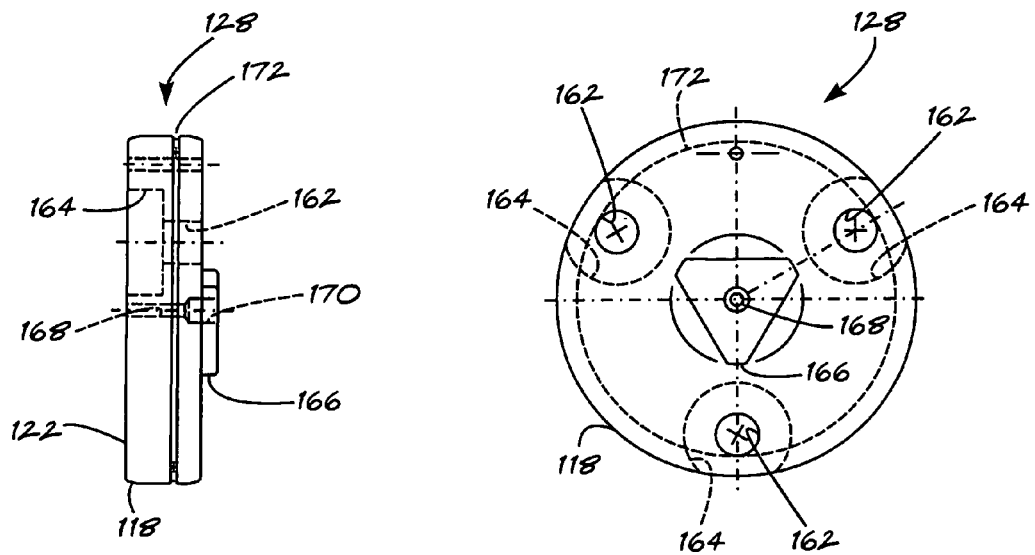
FIG. 12 is a side view of another portion of the piston head.
FIG. 13 is a front view of the portion of FIG. 12.

As shown in FIGS. 12 and 13, the cap 128 has openings 162 therethrough arranged for axial alignment with the openings 130 in the carrier 126 to facilitate attachment of the cap 128 to the carrier 126 via the bolts 132 and nuts 134. To accommodate the heads of the bolts 132, the openings 162 preferably have counterbores 164 extending axially into the front head surface 122 so the bolts heads are generally flush with or recessed relative to the front head surface 122 upon fastening the cap 128 to the carrier 126. The cap 128 preferably has a triangular lobed boss 166 extending for interfitting receipt between the bridge devises 150 on the carrier 126. A through passage 168 preferably extends coaxially through the cap 128, with the through opening 168 having a counterbore 170 extending into the boss 166. The front head 118 has an annular groove 172 extending about its periphery for receipt of a second replaceable piston ring 174 (FIG. 5).

As shown in FIG. 9, the roller pins or shafts 176 are constructed having a suitable length so that when opposite ends 177 of the respective shaft 176 are disposed in the axially aligned opposite openings 160, preferably in a press fit, the ends 177 do not extend beyond the walls 151, 152 of the carrier 126. The shaft ends 177 and/or carrier 126 could be peened to facilitate retaining the shafts 176 within the openings, if desired. As shown in FIG. 9, the shafts 176 are preferably further retained in the openings 160 by the shanks of the bolts 132 upon attaching the cap 128 to the carrier 126. If the apparatus is to be used in, for example, a high temperature environment, the shafts 176 are preferably constructed from a 440-C stainless steel hardened to about 55-58 Rockwell C, though other suitable bearing shaft materials could be used.

Prior to assembling the shafts 176 in the carrier 126, at least one guide roller 158 is disposed on each of the shafts 176 for relative rotation therewith. The rollers 158 can either have bores sized to be journaled directly on the shafts 176, or, as represented here, the bores 178 can be slightly oversized for receipt of sleeve bearings 180, which are preferably press fit within the bores 178 and preferably further retained using a high temperature adhesive. If the apparatus is to be used in, for example, a high temperature environment, the sleeve bearings 180 may be constructed from a high temperature composite bearing material, such as Vespel®, for example. The rollers 158 have an outer diameter such that an outer surface 182 of the rollers 158 extends at least partially radially outward from the front and rear heads 118, 120 for rolling engagement with the inner surface 66 of the housing 62. The outer surface 182 is preferably contoured with a similar radius of curvature as the inner surface 66 of the housing 62 and a surface finish of preferably about 64 μm to provide smooth axial rolling contact between the rollers 158 and the inner surface 66. If the apparatus is to be used in, for example, a high temperature environment, the rollers 158 are preferably constructed from 440-C stainless steel hardened to about 55-58 Rockwell C, though other suitable bearing materials could be used.

As shown in FIGS. 2, 3 and 5, preferably, front and rear bumpers 184, 186 are provided in the cylinder 62 on opposite sides of the piston head assembly 70. The front and rear bumpers 184, 186 have a predetermined axial thickness to define the desired range of axial movement of the piston head assembly 70 and the size of the end chambers. The front and rear bumpers 184, 186 are constructed from a resilient high temperature-resistant material, preferably having a durometer of about 70-75 Shore A, such as, by way of example and without limitations, Viton®. The front bumper 184 is preferably constructed as a generally solid disc, with an outer diameter slightly less than the inner surface 66 of the housing 62. The rear bumper 186 is constructed with a central opening 188 slightly larger in diameter than the diameter of the piston shaft 50 to allow the piston shaft 50 to move freely relative to the rear bumper 186.

Upon assembly, three communicating chambers are preferably defined within the shock absorber 12 to regulate the axial movement and dampening characteristics of the shock absorber. A first or front chamber 190 is defined between the front head surface 122 and the first end wall 72. A second or mid chamber 192 (FIG. 14), in which the rollers 158 are represented, by way of example and without limitations, as being carried, is defined between the front and rear heads 118, 120, at least in part by the pair of piston rings 148, 174. A third or rear chamber 194 is defined between the rear head surface 124 and the second end wall 78.

Figure 14:
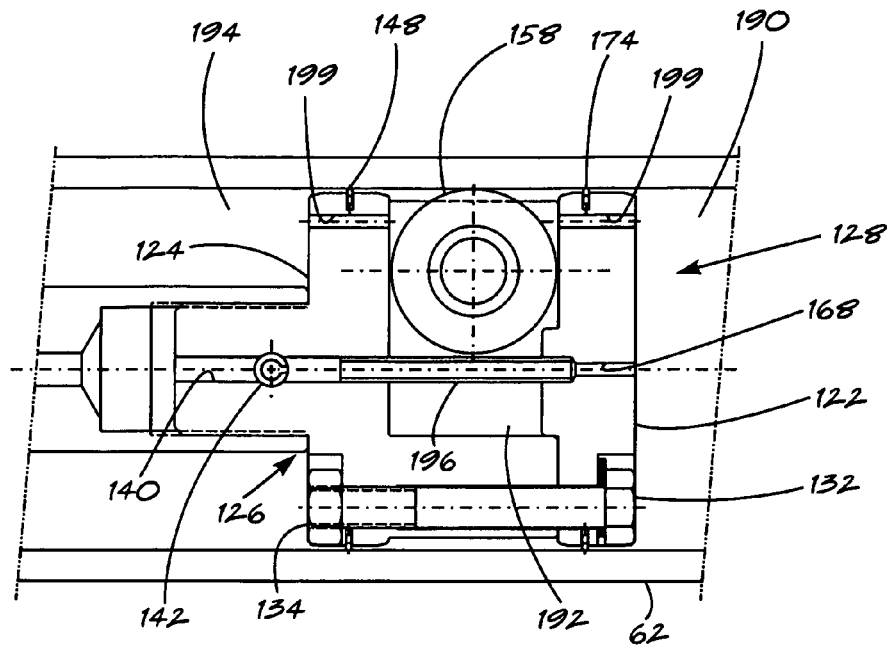
FIG. 14 is a partial cross sectional view taken generally along line 14-14 of FIG. 5.
Figure 15A:
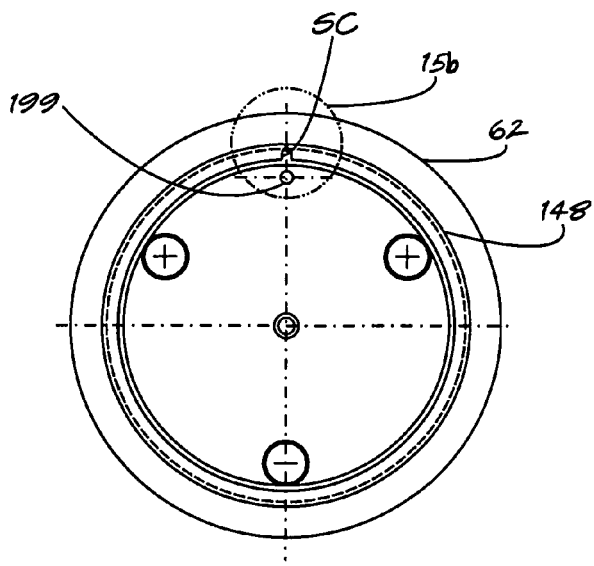
FIG. 15*a* is a front view of a housing of the shock absorber showing a piston ring received therein.
Figure 15B:
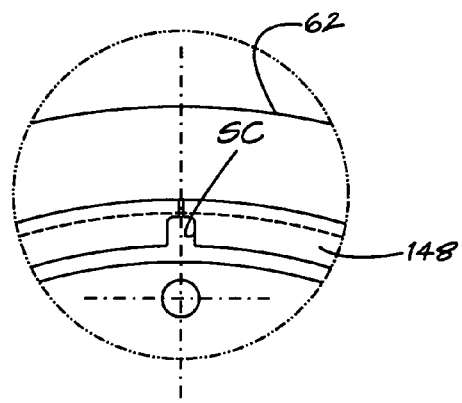
FIG. 15*b* is an enlarged view of the encircled area 15*b* of FIG. 15*a*.

As best shown in FIG. 14, to facilitate communicating the front chamber 190 with the rear chamber 194, a fluid communication member, such as a tube 196, for example, can be placed to extend coaxially between the carrier 126 and the cap 128 with opposite ends of the tube 196 being received in the through passage 140 in the carrier 126 and the passage 168 in the cap 128. The tube 196 can have an opening 197 (FIG. 5) extending through its side wall between the carrier 126 and the cap 128 to communicate the mid chamber 192 with the front and rear chambers 190, 194. Further, or alternatively, to communicate the front, mid, and rear chambers 190, 192, 194 with one another, the piston rings 148, 174 may be constructed having a radially inwardly extending scallops SC (FIGS. 15*a* and 15*b*) within, or scallops SC within and about, their outer peripheries. The scallops SC can be sized as necessary to achieve the desired flow rate between the front, mid, and rear chambers 190, 192, 194.

As such, the desired predetermined amount of fluid communication between the front, mid, and rear chambers 190, 192, 194 and consequently air or fluid pressures, can be finely controlled or tuned for different applications with regard to weight/mass and the preferred rate of absorption of the shock absorber 12. For example, the absorption rate of the shock absorber 12 can be adjusted by having more or fewer scallops SC in the peripheries of the piston rings 148, 174, by regulating the size of the respective through passages 140, 168 in the carrier 126 and cap 128, and by regulating the size of the tube 196, for example. Further, additional openings 199 (FIGS. 14 and 15*a*) could be formed in the carrier 126 and cap 128 to increase the flow rate between the respective chambers 190, 192, 194, or that one or more of the through passages 140, 168 could be plugged or eliminated, thereby limiting the communication between the passages to the flow around the piston rings 148, 174 and the piston ring scallops. Additionally, one or more of the piston rings 148, 174 could be removed, thereby combining at least a pair of adjacent ones of the chambers 190, 192, 194 with one another. For example, piston ring 174 could be removed, thereby combining the mid chamber 192 with the front chamber 190, thus, effectively changing the shock absorber 12 from a three chamber to a two chamber device. Otherwise, additional piston rings could be added, such as by incorporating at least a pair of piston rings within separates ones of the front and rear piston heads 118, 120, thereby acting at least in part to increase the seal between the adjacent chambers.

In use, the shock absorber 12 effectively contracts from a normal position in which the piston head assembly 70 is in central position during acceleration when the driving dog 28 of the leading trolley 18 is engaged by one of the pusher dogs 30, and stopping when the leading trolley 18 engages a trailing trolley 26. The respective chambers 190, 192, 194 communicate with one another to provide dampened, smooth load distributions between the mating components of the shock absorber 12, thereby greatly reducing the severity of the impact forces transmitted to the platforms 22 and vehicles 16. As the tow bar assembly 10 navigates the conveyor system 14, particularly around relatively sharp corners, or up inclined sections and down a descent, the rollers 158 provide the piston head assembly 70 with smooth, guided axial movement as it traverses the inner wall surface 66 of the housing 62, thereby improving the efficiency of the shock absorber 12 and increasing its useful life. The tow bar assembly 10 is generally constructed of materials capable of withstanding temperatures up to 500 degrees Fahrenheit, such as may be necessary when passing through paint curing environments.

Another implementation of a shock absorber 200 is shown in FIGS. 16-19. The shock absorber 200 includes a first end cap 204, a second end cap 232 a shell 228 between the end caps 204, 232 and preferably an outer end cap 206. The outer end cap 206 is adapted to be attached to, or may be part of an adaptor or a tool bar. The first end cap 204 is adapted to be attached to a trolley or other conveyor component. The first and outer end caps 204, 206 may include outwardly extending arms 208, 210 with through bores 212, 214 to permit connection to clevis-type connectors, or otherwise as desired. As in the prior embodiment shock absorber 12, a cover 216 is fixed to the outer end cap 206 and extends axially therefrom and at least partially toward the first end cap 204. The outer end cap 206 includes a blind bore 218 and a counterbore 220. The first end cap 204 includes a central through bore 222 generally aligned with the counter bore 220 in the outer end cap 206. The first end cap 204 also includes a radially outwardly extending and circumferentially continuous flange 224 in which a shallow counter bore 226 is formed.

Figure 16:
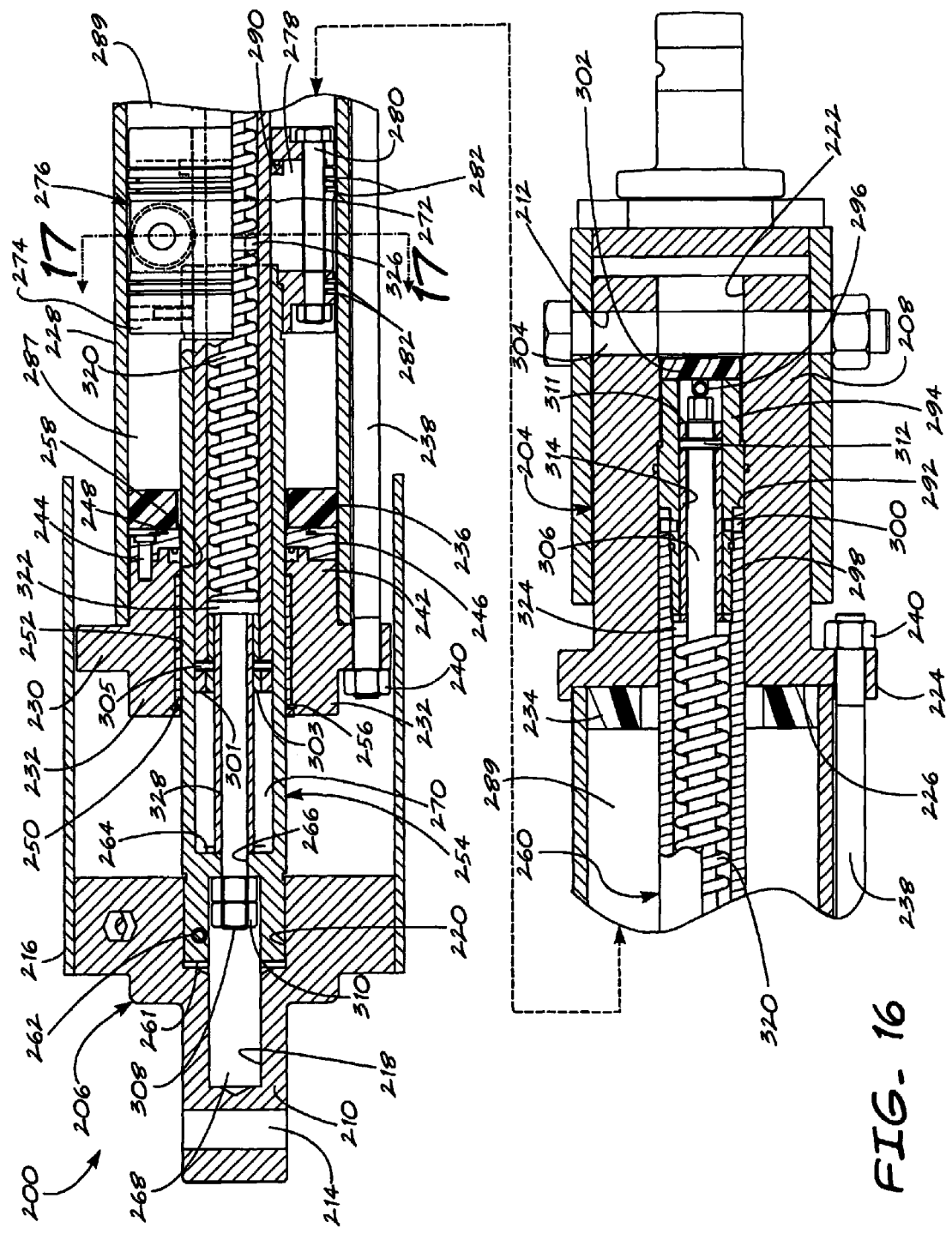
FIG. 16 is a partial sectional view of a modified shock absorber.

One end of the tubular sleeve 228 is disposed in the counter bore 226, and the other end of the tubular sleeve 228 bears on an outwardly extending flange 230 of the inner or second end cap 232 that is slidably disposed within the cover. A bumper 234 of a resilient and impact dampening material is preferably carried adjacent the first end cap 204 and within the sleeve 228. A similar bumper 236 is preferably disposed within the sleeve 228 and adjacent to the second end cap 232 as best shown in FIG. 16. As in the prior embodiment shock absorber 12, elongated rods 238 extend through openings in the flange 224 of the first end cap 204 and the second end cap 232, outside of the sleeve 228, and nuts 240 are tightened on threaded ends of the rods 238 to secure the second end cap 232, sleeve 228 and first end cap 204 together. The second end cap 232 also includes an axially extending portion 242 disposed within the sleeve 228 and including a plurality of threaded blind bores that receive screws 244 holding a seal cover 246 to the second end cap 232. A split ring retainer 248 is carried in a groove of the seal cover 246 to prevent the screws 244 from loosening or backing out of the bores. A bushing 250 is preferably received in a counter bore 252 of the second end cap 232 and surrounding a portion of an outer tube or piston rod 254. A split retaining ring 256 is preferably carried by the second end cap 232 to retain the bushing 250 in the counter bore 252. The second end cap 232 also includes a central bore 258 through which the piston rod 254 and an inner tube 260 extend, at least in part.

Figure 19:
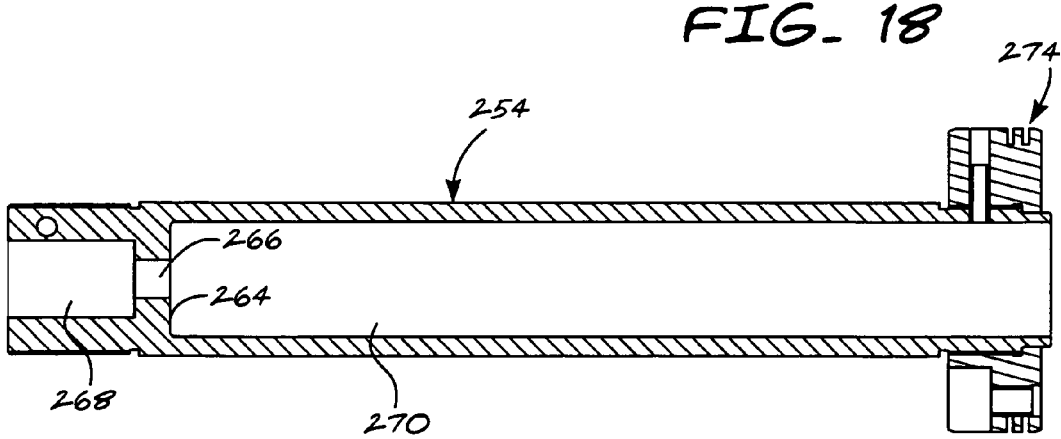
FIG. 19 is a sectional view of an outer tube and a portion of a piston.

The piston rod 254 is preferably a generally hollow tube threadedly received at one end 261 in the counter bore 220 of the outer end cap 206. A roll pin 262 may be provided between the outer end cap 206 and the piston rod 254 to prevent movement of the piston rod 254 relative to the end cap. The piston rod 254 preferably includes a radially inwardly extending shoulder 264 defining a through bore 266 and counterbores or chambers 268, 270 on opposed sides of the shoulder 264. As best shown in FIGS. 16 and 19, the piston rod 254 extends to a second threaded end 272 on which a first portion 274 of a piston 276 is threadedly received.

Figure 17:
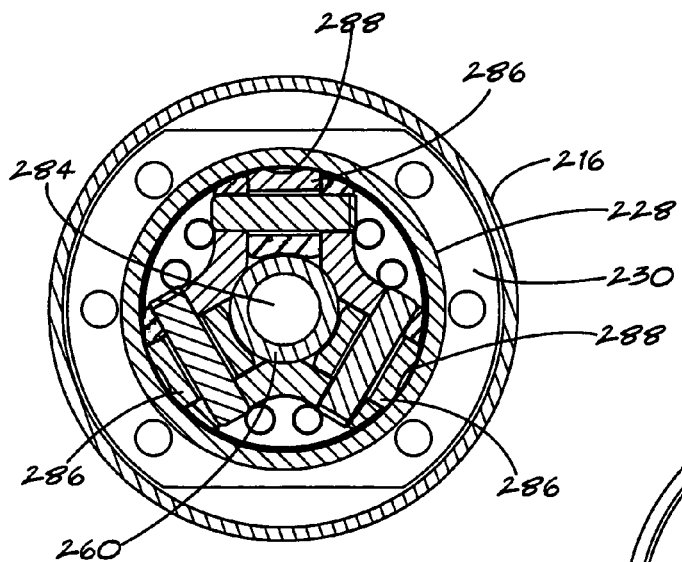
FIG. 17 is a sectional view taken along line 17-17 of FIG. 16.
Figure 18:
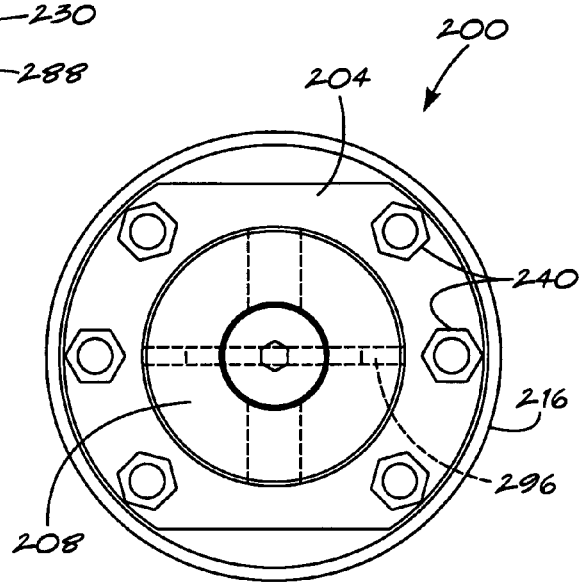
FIG. 18 is an end view of the shock absorber.

As best shown in FIGS. 16 and 17, the piston 276 preferably is constructed in the same general manner as the piston assembly 70 of the first embodiment shock absorber 12. The piston 276 includes first and second portions 274, 278 that are connected together by a plurality of bolts and nuts 280. The portions 274, 278 preferably carry one or more, and as shown here, four piston rings 282 that are generally circumferentially continuous about the exterior of the piston 276 and slidably guide the piston 276 for reciprocation within the sleeve 228. Each piston ring 282 is preferably split to facilitate its installation and is preferably received in a separate annular groove about the exterior of a corresponding portion or portions 274, 278 of the piston 276. As best shown in FIG. 17, a central opening 284 is provided through the piston 276 through which the inner tube 260 extends, but otherwise, the piston 276 may be substantially as described with regard to the first embodiment shock absorber 12. To accommodate the inner tube 260 which passes through the piston 276, the rollers 286 may have a groove or scallop 288 extending radially inwardly of and circumferentially about the periphery of the rollers 286. A shaft seal 290 is preferably carried by the piston surrounding the inner tube 260. The piston defines a first chamber 287 with the sleeve 228 and the second end cap 232 and a second chamber 289 with the sleeve 228 and the first end cap 204. Another chamber may be defined within the piston and between the chambers 287, 289.

The inner tube 260 is preferably a generally cylindrical, elongated and hollow tube that is connected at a first end 292 to the first end cap 204 and is received at its other end in the chamber 270 of the piston rod 254. The ends of the inner tube 260 preferably include internal threads as shown in FIG. 16.

The first end 292 of the inner tube 260 is connected to a cap 294 that is threadedly carried by the first end cap 204 and preferably further connected thereto by a pin 296 to prevent rotation of the cap 294 relative to the end cap 204. At its other end, the cap 294 has a reduced diameter portion 298 with external threads that are threadedly received in the first end 292 of the inner tube 260. Set screws 300 preferably are disposed in aligned bores in the inner tube 260 and cap 294 to prevent relative rotation between them. An end cap 302 may be disposed between an end of the cap 294 and a cross bolt 304 that connects an adjacent component to the first end cap 204 to prevent contaminants from fouling the apparatus. At its other end 301, the inner tube 260 is threadedly connected to a sleeve nut 303 and may be further connected thereto by a pin 305 to prevent relative rotation or movement between them.

A shaft 306 is disposed coaxially aligned with the inner tube 260 and piston rod 254 and is received in and through the inner tube 260. The shaft 306 preferably is threaded at least at one end 308 and a pair of nuts 310 are disposed on that end. The nuts 310 and shaft 308 end are slidably received in the chamber 268 of the piston rod 254 so that the nuts 310 may engage the shoulder 264 to prevent withdrawal of the shaft 306 through the bore 266. The other end 311 of the shaft 306 is connected to a tubular spacer 314 by respective threads and preferably a pin 312 that extends through the shaft 306 and into and through a tubular spacer 314 to prevent relative movement of these components. The spacer 314 is slidably received in a bore or passage of the cap 294 so that the spacer may move with the shaft 306 and relative to the cap 294.

At least one spring 320 is disposed within the inner tube 260. In the implementation shown, a pair of springs 320 are disposed in the inner tube 260 with separate washers 322, 324 at the outer ends of each spring 320 and a washer 326 disposed between the springs 320. For easier viewing, the shaft 306, springs 320 and washers 322, 324, 326 are not shown in section in FIG. 16. A spacer 328 is preferably partially received in the inner tube 260 at one end and bears on the shoulder 264 of the piston rod 254 at its other end such that the spacer 328 engages the washer 322 and provides at least part of a seat for the washer 322 to oppose the force of the spring 320 acting thereon. As shown, the springs 320 are preferably coiled compression springs and while two springs are shown, one spring or more than two springs may be used, as desired. The washers 322, 324, 326 at the outer ends and between the springs 320 provide generally flat or planar surfaces upon which the ends of the springs 320 act. The washers also engage the inner tube 260 and limit the extent to which the shaft 306 may bend. The initial force of the springs can be adjusted in any number ways, including reducing the effective distance between the outer washers 322, 324, such as with spacers of different length or by adjusting the effective length of the shaft 306, by using springs of different spring rates, and the like.

Accordingly, without significant forces acting on ether of the first or outer end caps 204, 206, the springs 320 tend to define or maintain a desired distance between the outer end caps and otherwise position the components of the shock absorber 200 in a first position. Providing a consistent first position of the shock absorber 200 can facilitate, among other things, docking of conveyor platforms.

In the embodiment shown, the first position is generally midway in the stroke of the shock absorber 200 so that the shock absorber 200 and piston 276 may be displaced substantially the same distance in either direction, depending on the load imparted on the shock absorber in use. In one implementation, the piston 276 may stroke about 3 inches in either direction from its first position, although of course, other stroke lengths may be used, and the stroke length need not be the same in each direction. The first position of the shock absorber 200 can be controlled, for example, by adjusting or changing the lengths of the spacers or other components which bear on the washers 322, 324 on the outer ends of the springs 320. The initial resistance to movement of the piston or end caps may be great enough so that during normal conveyor and tow bar movement, the shock absorber 200 remains generally in its first position.

Accordingly, movement of the outer end caps 204, 206 toward or away from each other is controlled by one or more of the springs 320, and a restricted or controlled air flow through the piston assembly 276. In one form, the controlled air flow through the piston assembly 276 occurs through the splits or gaps in the piston rings 282, although other airflow passages may be provided or formed in, through and among the piston assembly components or the sleeve, for example. The chambers 287, 289 on either side of the piston 276 preferably contain air at atmospheric pressure, although other fluids or gases and other pressures may be used.

In use, movement of one of the first end cap 204 or the outer end cap 206 toward the other, or both end caps 204, 206 toward each other, causes relative movement between the inner tube 260 and the piston rod 254. The cap 294 which is connected to and moves with the first end cap 204 bears on washer 324. The piston rod 254, which is connected to and moves with the outer end cap 206, includes the shoulder 264 that engages the spacer 328 which in turn bears on washer 322. Hence, as the end caps 204, 206 are moved in the direction noted, the washers 322, 324 are engaged by the cap 294 and the spacer 328, and the washers in turn bear on and compress the springs 320. This provides a force resisting the movement of the first end cap 204 and/or outer end cap 206. At the same time, the piston 276, which is fixed to the piston rod 254, is displaced within the sleeve 228. The piston 276 reduces the volume of and displaces air from one chamber 289 at a flow rate which is restricted and controlled by design in the piston as described. The controlled air flow rate through the piston 276 permits pressure to develop in the chamber 289 into which the piston 276 is being advanced, and that pressure provides a force acting on the piston 276 which also resists movement of the outer end cap 206.

Movement of one of the end caps 204, 206 away from the other, or both of the end caps 204, 206 away from each other, also causes relative movement between the piston rod 254 and the inner tube 260, but in the opposite direction than that just described. In this direction of movement, the sleeve nut 303, which is connected to and moves with the inner tube 260, engages and bears on the washer 322. Also, the nuts 310 on the shaft 306 are engaged by the shoulder 264 of the piston rod 254 which thereby displaces the shaft 306 relative to the inner tube 260 and causes the spacer 314 to engage the washer 324. Hence, as one or both of the end caps 204, 206 move as noted, the washers 322, 324 engage or are engaged by the sleeve nut 303 and the spacer 314, and the washers in turn bear on and compress the springs 320. This provides a force resisting the movement of the first end cap 204 and/or outer end cap 206. At the same time, this movement decreases the size of the air chamber 287 between the piston 276 and the second end cap 232. The restricted or controlled flow rate of the air through the piston 276 provides a force that dampens or resists the movement.

In each direction of movement, the washers 322 and 324 act as moveable seats for drive members that bear on the washers 322, 324 on the opposite side of the washers 322, 324 that the springs 320 bear on, to compress the springs. As noted above, the cap 294 and spacer 314 comprise the drive members that engage the seat or washer 322, and the sleeve nut 303 and spacer 328 comprise the drive members that engage the seat or washer 324 depending on the relative movement of the shock absorber components caused by forces acting on the shock absorber 200.

When the force tending to displace one or both of the end caps 204, 206 is reduced or terminated, the springs 320 will return the shock absorber 200 to its first position. This will occur whether the shock absorber is compressed (i.e. its axial length is reduced) or tensioned (i.e. its axial length is increased). This resets the shock absorber 200 to a position that preferably permits a stroke or displacement in either direction to avoid bottoming out the shock absorber 200, and to provide optimum performance of the shock absorber in use.

Upon reading the disclosure herein, one ordinarily skilled in the art would readily recognize other embodiments than those disclosed herein, with those embodiments being within the spirit and scope of the invention. For example, it should be recognized that the rollers 158 could be arranged to be carried in either or both of the front and rear chambers 190, 194, respectively, such as, by way of example and without limitations, by being operably supported from the front and rear head surfaces 122, 124. Accordingly, the disclosure herein is intended to be exemplary, and not limiting. The scope of the invention is defined by the following claims.

The invention claimed is:

1. An industrial shock absorber for use in a telescopic tow bar assembly, the shock absorber comprising:
   a housing having opposed ends and having a longitudinal axis defined between said ends;
   a first end cap adjacent one of said ends;
   a second end cap adjacent the end opposite said first end cap and having an opening therethrough;
   a piston rod received through said opening of said second end cap and having one end received in said housing and another end extending outwardly from said housing;
   a piston attached to said one end of said piston rod for movement with said piston rod between retracted and extended positions, the piston having a first head and a second head that are connected together to define at least in part a chamber therebetween;
   a plurality of rollers carried at least in part in said chamber and exposed at least partially from the piston for rolling engagement with said housing; and
   at least one spring that yieldably biases the piston rod and the first end cap to a first position wherein the piston rod includes a chamber and the piston includes a central opening and said at least one spring extends through said opening and in said chamber of the piston rod.

2. The shock absorber of claim 1 which also includes an inner tube that is hollow and is received at least in part in the chamber of the piston rod and through the opening of the piston, and wherein said at least one spring is received in the inner tube.

3. The shock absorber of claim 1 wherein the piston rod includes a shoulder and said at least one spring acts on the shoulder to yieldably bias the piston rod away from the first end cap.

4. The shock absorber of claim 3 wherein a spacer is disposed between said at least one spring and the shoulder.

5. The shock absorber of claim 2 wherein said inner tube is slidably received in the chamber of the piston rod and the inner tube is moveable relative to the first end cap so that the inner tube moves with the first end cap when the first end cap is moved in a first direction and the inner tube moves relative to the first end cap when the first end cap is moved in a direction opposite to the first direction.

6. The shock absorber of claim 2 which also includes a shaft disposed in the inner tube and about which said at least one spring is received, the shaft being operably connected to the first end cap and slidably received in the piston rod.

7. The shock absorber of claim 6 wherein the piston rod includes a shoulder that defines an opening and a pair of chambers on opposed sides of the shoulder and the shaft extends through the opening.

8. The shock absorber of claim 7 which also includes a retainer received in a chamber of the piston rod on the opposite side of the shoulder as said at least one spring, the retainer being connected to the shaft and adapted to engage the shoulder to prevent withdrawal of the shaft through the opening.

9. An apparatus for controlling relative movement between two interconnected bodies the apparatus including:
   a first end cap, a second end cap having an opening therethrough, a sleeve extending between and interconnecting the end caps to define a chamber between the sleeve and the end caps and at least one rod connected at one end to the first end cap and at its other end to the second end cap to connect together the end caps and the sleeve;

a piston assembly including a piston rod extending through the opening of the second end cap so that a first end of the piston rod extends out of the second end cap, a piston connected to the piston rod for movement with the piston rod, received in the chamber to divide the chamber into at least two fluid chambers on opposed sides of the piston, and a plurality of rollers carried by the piston for rolling engagement with the sleeve, the piston being moveable within the chamber to thereby decrease the volume of one of the fluid chambers while increasing the size of the other fluid chamber;

a fluid flow path providing communication between the fluid chambers and providing a restricted fluid flow rate therethrough to control the rate of fluid transfer between the fluid chambers and permit fluid pressure to increase in a chamber into which the piston is being moved to provide a force on the piston opposing its movement;

at least one spring associated with the piston rod and the first end cap to yieldably resist movement of the first end of the piston rod or the first end cap in a direction tending to decrease the distance between the first end of the piston rod and the first end cap and to also yieldably resist movement of the first end of the piston rod or the first end cap in a direction tending to increase the distance between the first end of the piston rod and the first end cap; and a tube coupled to the first end cap for movement with the first end cap, the tube being associated with the spring to act on one end of the spring and compress the spring when the first end cap is moved away from the first end of the piston rod and to act on the other end of the spring and compress the spring when the first end cap is moved toward the first end of the piston rod.

10. The apparatus of claim 9 which also includes a shaft coupled to the piston rod for movement with the piston rod in at least a first direction of the piston rod movement, wherein the shaft is coupled to the spring so that the spring is compressed when the piston rod moves in said first direction.

11. The apparatus of claim 10 wherein the piston rod is coupled to the spring to compress the spring when the piston rod is moved in a direction opposite to said first direction.

* * * * *

UNITED STATES PATENT AND TRADEMARK OFFICE
CERTIFICATE OF CORRECTION

PATENT NO. : 7,600,617 B1  Page 1 of 1
APPLICATION NO. : 11/390548
DATED : October 13, 2009
INVENTOR(S) : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this

Fifth Day of October, 2010

David J. Kappos
*Director of the United States Patent and Trademark Office*